United States Patent
Fernandes

(10) Patent No.: US 12,115,934 B2
(45) Date of Patent: Oct. 15, 2024

(54) VEHICLE ACCESS SYSTEM AND METHOD OF ACCESSING A VEHICLE

(71) Applicant: Continental Automotive GmbH, Hannover (DE)

(72) Inventor: Brian Sunil Nicholas Fernandes, Singapore (SG)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/749,766

(22) Filed: May 20, 2022

(65) Prior Publication Data

US 2022/0371550 A1 Nov. 24, 2022

(30) Foreign Application Priority Data

May 21, 2021 (GB) ..................................... 2107276

(51) Int. Cl.
*B60R 25/24* (2013.01)
(52) U.S. Cl.
CPC ...... *B60R 25/245* (2013.01); *B60R 2325/101* (2013.01)
(58) Field of Classification Search
CPC .......................... B60R 25/245; B60R 2325/101
See application file for complete search history.

(56) References Cited

U.S. PATENT DOCUMENTS

| | | | |
|---|---|---|---|
| 6,757,571 B1 * | 6/2004 | Toyama | G06V 10/24 700/47 |
| 8,280,583 B2 | 10/2012 | Staehlin et al. | |
| 8,965,287 B2 | 2/2015 | Lam | |
| 9,042,850 B2 | 5/2015 | Chia et al. | |
| 9,240,850 B2 | 1/2016 | Du et al. | |
| 2008/0150712 A1 | 6/2008 | Cooprider et al. | |

(Continued)

FOREIGN PATENT DOCUMENTS

| | | |
|---|---|---|
| CA | 2730269 A1 | 1/2010 |
| CN | 111096003 A | 5/2020 |

(Continued)

OTHER PUBLICATIONS

Extended European Search Report dated Oct. 14, 2022 from corresponding European patent application No. 22169979.6.

(Continued)

*Primary Examiner* — Thomas D Alunkal

(57) ABSTRACT

Disclosed are a vehicle access system and method with at least two sets of a receiver and a transmitter, each set configured to receive a type of wireless communication signal from a corresponding transmitter of a user device, and the type of wireless communication signal received by a set is different from that received by at least another set; a signal module communicating with each set, each signal module configured to process the wireless communication signals received from the set to determine an initial location of the user device relative to the vehicle; a localization module communicating with the signal modules and configured to determine a final location of the user device relative to the vehicle, based on the initial locations determined by the signal modules; and a controller configured to lock or unlock a door of the vehicle based on the determined final location of the user device.

20 Claims, 2 Drawing Sheets

(56) References Cited

U.S. PATENT DOCUMENTS

| | | | |
|---|---|---|---|
| 2013/0143594 A1 | 6/2013 | Ghabra et al. | |
| 2015/0263771 A1* | 9/2015 | Bakhri et al. | |
| 2018/0099643 A1* | 4/2018 | Golsch | G01S 13/765 |
| 2018/0234797 A1* | 8/2018 | Ledvina | B60R 25/24 |
| 2019/0086526 A1 | 3/2019 | Golsch | |
| 2020/0128354 A1* | 4/2020 | Smith | G01S 5/0289 |
| 2020/0271770 A1* | 8/2020 | Golsch | B60R 25/245 |
| 2020/0367165 A1 | 11/2020 | Fernandes | |
| 2021/0061225 A1 | 3/2021 | Ahmed | |
| 2021/0173072 A1* | 6/2021 | Spick | G01S 13/04 |
| 2022/0281412 A1* | 9/2022 | Park | G05D 1/0022 |

FOREIGN PATENT DOCUMENTS

| | | |
|---|---|---|
| GB | 2600438 A | 5/2022 |
| WO | 2019034226 A1 | 2/2019 |
| WO | 2020058020 A1 | 3/2020 |
| WO | 2022089790 A1 | 5/2022 |

OTHER PUBLICATIONS

"Radiolocation", Wikipedia, 2020.
"PASE for more freedom", Continental, 2020.
Christoph Hammerschmidt "Bluetooth LE-based passive keyless entry locks out car thieves", 2018, https://www.eenewsautomotive.com.
Search Report dated Nov. 19, 2021 from corresponding GB patent application No. GB2107276.4.

* cited by examiner

VEHICLE ACCESS SYSTEM AND METHOD OF ACCESSING A VEHICLE

BRIEF DESCRIPTION OF THE DRAWINGS

In the figures, like numerals denote like parts.

DETAILED DESCRIPTION

Figure 1:
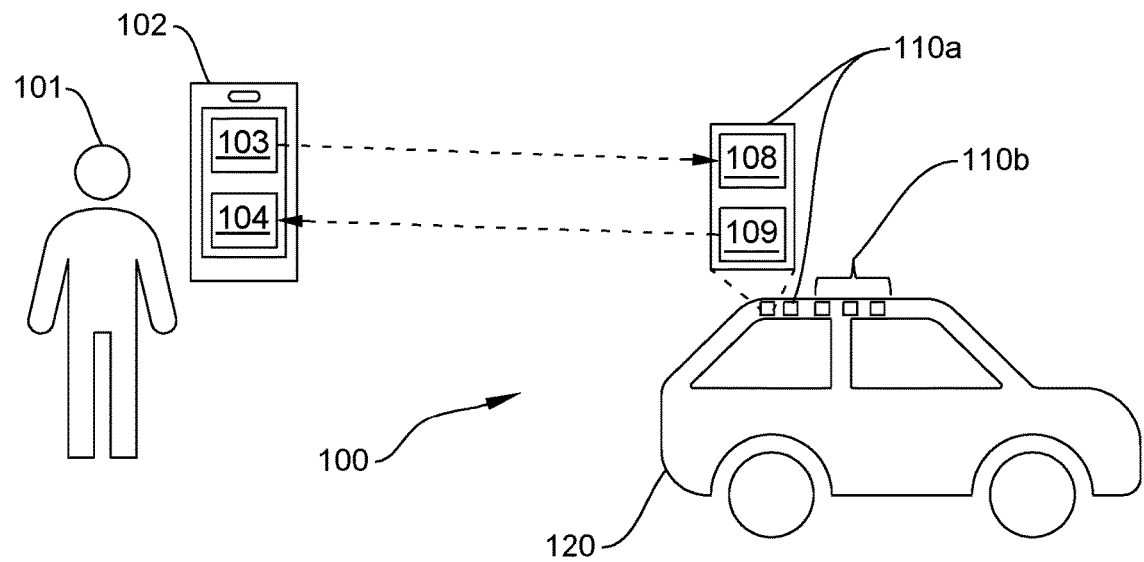
FIG. 1 shows an illustration of vehicle access system 100 in accordance with an embodiment of the disclosure.

The disclosure relates to a vehicle access system and a method of accessing a vehicle.

Some passive access or passive entry systems use short-range wireless communication signals or communication protocols between a user device and a vehicle access system, such that a user may lock and unlock a motor vehicle hands-free, without using mechanical keys to do the same. Such short-range wireless communication often uses radio waves to achieve the aforesaid hands-free access due to the low interference with other types of electromagnetic waves. Passive access or passive entry systems may also be termed passive access and secure entry system. These access systems may include the function of remotely starting a vehicle's engine or motor, thus may also be termed passive start and entry system.

Different countries have different regulatory standards that mandate operation in different spectrums of radio waves. For example, a Bluetooth Low Energy (BLE)-based passive access or passive entry system may be allowed to use different frequencies, parameters and/or different power levels in different countries. An ultra-wide band (UWB)-based passive access or passive entry system may be allowed to use different frequencies, channels and/or different bandwidths in different countries. The same applies for low frequency-based passive access or passive entry systems.

Furthermore, each type of passive access or passive entry system may have different localization methods or algorithms in order to locate the user device with respect to the vehicle. The different localization methods or algorithms may be subject to different constraints and/or operational characteristics.

There is therefore a need to provide a passive access or passive entry system that overcomes, or at least ameliorates, the problem(s) described above and other disadvantages. There is a need to take into account the many differences required for an access system and access method, yet a need to be able to take advantage of these differences.

It is an object to provide a vehicle access system and a method of accessing a vehicle to address the problems discussed above.

To accomplish this and other objects, in an aspect, a vehicle access system is provided comprising: at least two sets of receivers and transmitters, wherein each set of receiver and transmitter is configured to receive a type of wireless communication signal from a corresponding transmitter of a user device, and wherein the type of wireless communication signal received by a set of receiver and transmitter is different from that received by at least one other set of receiver and transmitter; a signal module in communication with each set of receiver and transmitter, wherein each signal module is configured to process the wireless communication signals received from a set of receiver and transmitter to determine an initial location of the user device relative to the vehicle; a localization module in communication with the signal modules, wherein the localization module is configured to determine a final location of the user device relative to the vehicle, based on the initial locations determined by the signal modules; and a controller configured to lock or unlock a door of the vehicle based on the determined final location of the user device.

In another aspect, a method of accessing a vehicle is provided, the method comprising: receiving, by at least two sets of receivers and transmitters of the vehicle, at least two different types of wireless communication signals from corresponding transmitters of a user device, wherein each set of receiver and transmitter is configured to receive a type of wireless communication signal different from that received by at least one other set of receiver and transmitter; processing, by each of a signal module in communication with a set of receiver and transmitter, the wireless communication signals received from the set of receiver and transmitter to determine an initial location of the user device relative to the vehicle; determining, by a localization module of the vehicle, a final location of the user device relative to the vehicle, based on the initial locations determined by the signal modules; and locking or unlocking a door of the vehicle based on the determined final location of the user device.

The disclosed system comprises at least two wireless technology-based access systems. Advantageously, the disclosed system has the ability to communicate using at least two different types of wireless technologies. Hence, fewer or even no modifications to the disclosed system are required in the event that a type of wireless technology is not approved in some regions. The disclosed system and method therefore advantageously circumvent the complexity of designing and developing different products to meet the many requirements of an access system, as well as the need for validating each of these different products.

Further advantageously, localization of the user device as disclosed herein takes into account the locations determined by each type of wireless technology. Unlike systems that may dynamically select a single, most optimal type of wireless technology for localization based on the region of operation, the disclosed system and method fully utilize the capabilities of having at least two different types of wireless technology-based access systems in order to determine the final location of the user device relative to the vehicle. Advantageously, the disclosed system and method may mitigate localization failures due to any of the many possibilities, such as interference of a type of wireless communication signal, jamming or overloading of a radio spectrum, inherent accuracies of a type of wireless communication signal, loss of a transceiver, receiver and/or transmitter, or even a whole system of a type of wireless technology, cyber-attacks etc. Further, the provision of at least two initial locations of the user device may advantageously narrow down the area in which the user device most likely is, thereby providing a better estimate of the location of the user device and increasing the accuracy of locating the user device. Yet further, as the final location takes into account at least two initial locations, the uncertainty of estimating the actual position of the user device may advantageously decrease. Accurate localization of the user device is imperative in order to provide a secure access system and lock or unlock the correct door of the vehicle.

In some embodiments, the signal module may be configured to periodically receive, from a telematics unit of the vehicle, tuning parameters for processing the wireless communication signals received from the user device. In some embodiments, the method may further comprise: periodically receiving, by the signal modules, tuning parameters for processing the wireless communication signals received from the user device.

Advantageously, the disclosed system and method may be updated to adapt to the various requirements of access systems or to optimize the parameters or system configurations due to government regulations, newly-released models of user devices or software, for example.

In some embodiments, the set of receiver and transmitter configured to receive a type of wireless communication signal may comprise: a first subset of receiver and transmitter configured to receive said type of wireless communication signal at a first predefined frequency range; and a second subset of receiver and transmitter configured to receive said type of wireless communication signal at a second predefined frequency range. In some embodiments, receiving a type of wireless communication signal by a set of receiver and transmitter may comprise: receiving said type of wireless communication signal, by a first subset of receiver and transmitter, at a first predefined frequency range; and receiving said type of wireless communication signal, by a second subset of receiver and transmitter, at a second predefined frequency range.

Advantageously, the disclosed system may comprise components, i.e. subsets of receivers and transmitters, of a wireless technology-based access system or a type of wireless technology to enable operation in regions where frequency ranges of that type of wireless technology are different. The predefined frequency ranges may be in compliance with regulatory standards of different regions.

In some embodiments, the first subset of receiver and transmitter or the second subset of receiver and transmitter may be selectively operated based on a geographical location of the vehicle. In some embodiments, the method may further comprise selectively operating the first subset of receiver and transmitter or the second subset of receiver and transmitter based on a geographical location of the vehicle.

Advantageously, the correct subset of receiver and transmitter may be selectively operated or activated corresponding to the frequency range relevant to the identified geographical location or region of the vehicle.

Hereinafter, exemplary embodiments of the present disclosure will be described in detail with reference to the accompanying drawings. The detailed description of this disclosure is provided for the purpose of explaining the principles of the disclosure and its practical application, thereby enabling a person skilled in the art to understand the disclosure for various exemplary embodiments and with various modifications as are suited to the particular use contemplated. The detailed description is not intended to be exhaustive or to limit the disclosure to the precise embodiments disclosed. Modifications and equivalents will be apparent to practitioners skilled in this art and are encompassed within the spirit and scope of the appended claims.

In an embodiment, there is provided a vehicle access system. The vehicle access system comprises at least two sets of receivers and transmitters. Each set of receiver and transmitter is configured to receive a type of wireless communication signal from a corresponding transmitter of a user device. As there are at least two sets of receivers and transmitters, the type of wireless communication signal received by a set of receiver and transmitter is different from that received by at least one other set of receiver and transmitter. That is, each set of receiver and transmitter is configured to receive a type of wireless communication signal different from that received by at least one other set of receiver and transmitter.

The vehicle access system further comprises a signal module in communication with each set of receiver and transmitter. Each signal module is configured to process the wireless communication signals received from a set of receiver and transmitter to determine an initial location of the user device relative to the vehicle. Thus, there may be at least two signal modules in the vehicle access system that are in communication with the at least two sets of receivers and transmitters.

The vehicle access system further comprises a localization module in communication with the signal modules. The localization module is configured to determine a final location of the user device relative to the vehicle, based on the initial locations determined by the signal modules.

The vehicle access system further comprises a controller configured to lock or unlock a door of the vehicle based on the determined final location of the user device.

The term "a type of wireless communication signal" refers to the signals of a category of radio access network (RAN), either existing currently or in the future, including all of its variants, for example across all of the relevant frequency ranges, channels, and bandwidths and methods, even though the frequency range of a type of RAN may overlap with another type of RAN. A type of wireless communication signal or a category of radio access network, as used in the context of the present application, also encompasses proprietary wireless systems and other wireless systems that may or may not involve bi-directional communication and may or may not be standardized according to national or international standards. The radio access network used in the context of the present application, also referred to as a wireless technology, enables the localization of a node, such as a user device, upon wireless communication between two or more nodes, including said node. Suitable radio access networks include wireless wide area networks (e.g., 5G, etc), wireless local area networks (e.g., WiFi, etc), and wireless personal area networks (e.g., Bluetooth, UWB, etc). Accordingly, an example of one type of wireless communication signal or signals of one category of RAN is low frequency with radio frequency (LF-RF). Another example of one type of wireless communication signal or signals of one category of RAN is mmWave. Another example of one category of RAN is BLE. Yet another example of one category of RAN is UWB.

The type of wireless communication signals may be selected from low frequency (LF) signals, radio frequency (RF) signals, high frequency (HF) signals, ultra-high frequency (UHF) signals, mmWave signals, signals from ultra-wide band (UWB) protocol, signals from ultra-narrow band protocol, signals from Bluetooth Low Energy (BLE) protocol, or any other protocols, wireless technologies, wireless communication methods or wireless communication standards.

Different access systems use different methods for localization of a vehicle user or, more particularly, a user device. In general, localization of the user device may be used to identify if the user is approaching or walking away from the vehicle and/or if the user is inside or outside the vehicle. Upon identification of a user or localization or authentication of the user device, the access system may activate or cause activation of general comfort features or any other vehicle function, or may actuate or cause actuation of general comfort features or any other vehicle function, such as welcome lighting or a light or sound indication to find a lost vehicle. Upon identifying that the user is walking away from the vehicle, the access system may lock or cause locking of all doors of the vehicle. Upon identifying that the user is approaching from the vehicle, the access system may unlock or cause unlocking of all doors of the vehicle. Localization of the user device may identify if the user is close to a particular door or trunk of the vehicle. Upon localization of the user device and/or authentication of the user device, the access system may lock or unlock or cause locking or unlocking of a particular door closest to the user. In the context of the present application, a door of the vehicle includes any entrance into the interior of the vehicle, and therefore the term "door" includes the trunk, sunroof or window of the vehicle, or any other actuatable panel or interface enclosing the interior of the vehicle. Hence, the initial location and the final location of the user device determined by the disclosed system may be relative to a door of the vehicle.

The different methods of localization are described with reference to FIG. 1. Referring to FIG. 1, a user 101 of vehicle 120, for example a driver of vehicle 120, carries a user device 102 which may comprise a transceiver having a transmitter 103 and a receiver 104. Transmitter 103 may be configured to transmit one, two or more types of wireless communication signals. User device 102 may comprise a transmitter 103 or a plurality of transmitters 103 configured to transmit multiple types of wireless communication signals. Receiver 104 may be configured to receive one, two or more types of wireless communication signals. User device 102 may comprise a receiver 104 or a plurality of receivers 104 configured to receive multiple types of wireless communication signals.

As used herein, a user device may be a user equipment, a machine-to-machine (M2M) device, a mobile phone or smartphone, a Personal Digital Assistant (PDA), laptop, personal computer (PC), or tablet PC, a smart wearable such as a smart watch, headband, ring, etc, a portable electronic radio communication device, a key fob, a smart card, or any other device that is mobile and is capable of being localized by a vehicle access system, or the like.

Vehicle 120 or the vehicle access system 100 may comprise a plurality of transceivers 110. A transceiver 110 may comprise a transmitter 109 and a receiver 108. Alternatively, the vehicle access system 100 may comprise at least two sets of or a plurality of transmitters and/or receivers, each set of transmitters and/or receivers being configured to receive a type of wireless communication signal from a corresponding transceiver of a user device, wherein the type of wireless communication signal received by a set of transmitters and/or receivers is different from that received by at least one other set of transmitters and/or receivers. A set 110 may be a set of transceivers or a set of receiver(s) and transmitter(s). A set 110 may comprise at least one transmitter and at least one receiver. A set 110 may comprise one transmitter and at least one receiver. Hence, the vehicle access system 100 may comprise at least two sets of or a plurality of transmitters and receivers, each set of transmitter and receiver being configured to receive a type of wireless communication signal from a corresponding transmitter of a user device, wherein the type of wireless communication signal received by a set of transmitter and receiver is different from that received by at least one other set of transmitter and receiver. Transmitter 109 may be configured to transmit one, two or more types of wireless communication signals, while receiver 108 may be configured to receive one, two or more types of wireless communication signals. Alternatively, block 110 may comprise a plurality of transmitters 109 configured to transmit multiple types of wireless communication signals and/or a plurality of receivers 108 configured to receive multiple types of wireless communication signals.

In the context used herein, the term "receiver" refers to an electronic device for receiving wireless signals, such as the wireless communication signals disclosed herein, and the term "transmitter" refers to an electronic device for transmitting such wireless signals. Therefore, the term "transceiver" refers to an electronic device having both the function of transmitting and receiving wireless signals. In certain embodiments disclosed herein, the term "transceiver" may refer to an electronic device having at least one receiver and at least one transmitter to achieve the function of transmitting and receiving wireless signals. A transceiver, receiver or transmitter may be in communication with or connected to an antenna.

The plurality of sets 110 may comprise one set of transceivers 110*a* and another set of transceivers 110*b*. The set of transceivers 110*a* may include one, two, or more transceivers. The set of transceivers 110*b* may include one, two, or more transceivers. The plurality of sets 110 may comprise one set 110*a* of transmitter(s) and receiver(s) and another set 110*b* of transmitter(s) and receiver(s). Depending on the type of wireless communication signal, a set of transceivers, or a set of transmitter(s) and receiver(s), of a vehicle access system may typically comprise two transceivers, or two receivers and two transmitters, in communication with a corresponding transceiver, or at least a corresponding transmitter, of the user device, in order to form three points for triangulation. In some examples, a set may comprise three, four, five, six, seven, eight, nine, ten or more transceivers, or receivers and/or transmitters, in communication with a corresponding transceiver, or transmitter, of the user device. Each transceiver, or transmitter and receiver, of vehicle access system 100 may be positioned or orientated on vehicle 120 so that the line of sight and field of view of all the transceivers, or transmitters and receivers, may cover sufficient or substantially all regions around the vehicle 120. The transceivers, or transmitters and receivers, of vehicle access system 100 may be substantially equally distributed or affixed on vehicle 120 to cover all regions around vehicle 120. Hence, the more there are transceivers, or transmitters and receivers, in a vehicle access system 100, the more likely that a user device may be identified or localized in any region around vehicle 120. The upper limit number of transceivers, or transmitters and receivers, may depend on the wireless technology and frequencies used.

In some embodiments, a method of localization includes the LF/RF method. Transmitter 103 may be configured to transmit RF signals, while receiver 108 of set 110*a* may be configured to receive RF signals. Transmitter 109 of set 110*a* may be configured to transmit LF signals, while receiver 104 may be configured to receive LF signals. In set 110*a*, there may be two or more LF/RF transceivers, or receivers and transmitters. In some embodiments, transmitter 109 may be configured to transmit LF signals or other types of wireless communication signals periodically, continuously or intermittently, to await a receiver, such as receiver 104, to receive the signal. The receiver 104 may receive the signal when the user device 102 is within a predefined zone or "unlock" zone of vehicle 120. Methods of transmitting signals, also known as request signals or a broadcast message, and methods of receiving such signals are out of scope of this disclosure and shall not be described further.

In some embodiments, a method of localization includes the BLE method. In an example, transmitter 103 and transmitter 109 of set 110b may be configured to transmit BLE signals, while receiver 108 of set 110b and receiver 104, respectively, may be configured to receive BLE signals. In some embodiments, a method for localization includes the UWB method. In an example, transmitter 103 and transmitter 109 of another set 110c (not shown) of the disclosed vehicle access system 100 may be configured to transmit UWB signals, while receiver 108 of set 110c and receiver 104, respectively, may be configured to receive UWB signals. In some embodiments, a method for localization includes the mmWave method. In an example, transmitter 103 and transmitter 109 of another set 110d (not shown) of the disclosed vehicle access system may be configured to transmit mmWave signals, while receiver 108 of set 110d and receiver 104, respectively, may be configured to receive mmWave signals.

Thus, the disclosed vehicle access system 100 may comprise set 110a, which may provide a method to determine an initial location of the user device 102 relative to vehicle 120. The vehicle access system 100 may comprise set 110b, which may provide another method to determine an initial location of the user device 102 relative to vehicle 120. The vehicle access system 100 may comprise set 110c, . . . , set 110n, or more, which may provide further methods to determine an initial location of the user device 102 relative to vehicle 120.

Figure 2:
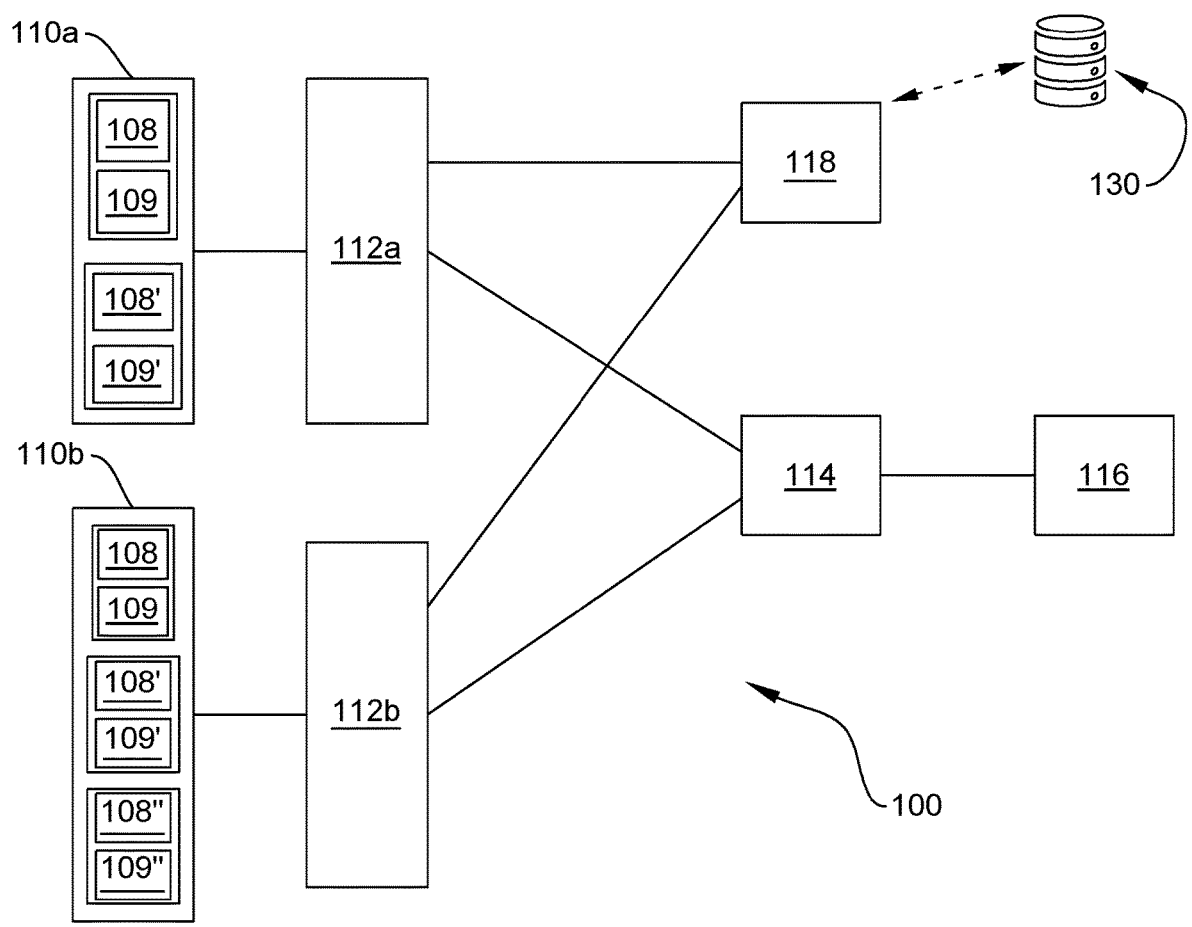
FIG. 2 shows another illustration of vehicle access system 100 in accordance with an embodiment of the disclosure.

Each set is in communication with a signal module. Referring to FIG. 2, set 110a, which may comprise two transceivers and each transceiver may comprise transmitter 109 or 109' and receiver 108 or 108', is in communication with signal module 112a. Set 110b, which may comprise three transceivers and each transceiver may comprise transmitter 109, 109' or 109" and receiver 108, 108' or 108", is in communication with signal module 112b.

The wireless communication signals from a set may be transmitted to the signal module that the set is in communication with. The signal module and the set may be incorporated or integrated as a system. The signal module may be part of the set to be incorporated into the vehicle or the vehicle area network. Alternatively, the signal module may be incorporated or integrated into an electronic control unit (ECU) of the vehicle, such as an access ECU, an antenna module or ECU, a body control module or body ECU, or a body computing unit. The set may be connected to the signal module by interconnects, wire or wirelessly. The set may be connected to the signal module through a vehicle area network. Examples of a vehicle area network may include Controller Area Network (CAN), Local Interconnect Network (LIN), FlexRay, Ethernet, or any other communication standard for vehicle area networks.

The signal module, for example 112a, may be configured to process the wireless communication signals received from a set 110a. The signal module may determine, based on the type of wireless communication signals it processes, a location of the user device relative to the vehicle. The location of the user device determined by the signal module is termed herein as the "initial location". The signal module 112a may determine the signal transit time of the peak path signal, which is called the Time of Flight (ToF), between transmitter 103 and receiver 108 or 108'. The signal module 112a may determine the initial location of the user device 102 relative to the vehicle 120 based on the distance between the user device 102 and vehicle 120 and/or the ToF value. For example, the signal module 112a may determine the initial location of the user device 102 relative to the vehicle 120 based on the ToF value of the BLE signals received by 108 or 108'. In another example, the signal module 112a may determine the initial location of the user device 102 relative to the vehicle 120 based on the ToF value of the UWB signals received by 108 or 108'. Additionally or alternatively, receiver 108 or 108' may receive a signal from transmitter 103 of user device 102 comprising a measurement of strength of the signal, which is called the Received Signal Strength Indicator (RSSI). The signal module 112a may determine the distance between the user device 102 and the vehicle 120 based on the RSSI value. The signal module 112a may determine the initial location of the user device 102 relative to the vehicle 120 based on the distance determined. For example, the signal module may determine the initial location of the user device relative to the vehicle 120 based on the RSSI value of the type of wireless communication signals received by 108 or 108'. Other methods to determine the initial location of the user device 102 may include determining the power level of a signal received by receiver 108 or 108' and/or performing distance measurement via phase angle or delay, angle of arrival ("AoA"), angle of departure ("AOD"), radio detection and ranging (RADAR)-based methods, 1-way or 2-way ranging methods, other range-based methods, etc, or any other methods to determine the location of a user device relative to the vehicle, either existing currently or in the future. The initial location of the user device may be determined by Received Signal Strength Indicator (RSSI), Time of Flight (ToF), Angle of Arrival (AoA), range-based methods, or any combination thereof.

The processing of the signals in a signal module 112 may include plotting the distance measured or the initial location of the user device 102 on a positioning grid. A wireless technology and/or a signal module 112 may utilize grid spacings that are different from another wireless technology and/or another signal module 112. Furthermore, each set 110 may include multiple transceivers, or multiple transmitters and/or receivers, in which a transceiver or receiver may arrive at a position estimate that is different from another transceiver or receiver. The initial locations from each signal module 112 may advantageously be analyzed together to provide a better estimate of the actual location of the user device 102. An analysis of all estimates of initial locations may reduce or even eradicate failures and/or inherent inaccuracies of any type of wireless technology and/or signal module.

The initial locations determined by signal modules 112 may be transmitted to the localization module 114. The localization module 114 may be incorporated or integrated into an ECU of the vehicle, such as an access ECU, a body control module or body ECU, or a body computing unit. The signal modules 112 and the localization module 114 may be incorporated or integrated into a common ECU, such as the access ECU. The signal modules 112 may be connected to the localization module 114 by interconnects, wire or wirelessly. Where the signal modules 112 and the localization module 114 are comprised in a common ECU, such as an access ECU, the at least two sets of transceivers, or at least two sets of receivers and/or transmitters, may be connected to the localization module 114 through the vehicle area network.

The localization module 114 may be configured to determine a final location of the user device relative to the vehicle 120, based on the initial locations determined by the signal modules 112. The final location of the user device 102 relative to the vehicle 120 takes into account the initial locations determined by the signal modules 112.

The final location of the user device 102 may be determined by statistical analysis of the initial locations. The final location of the user device 102 may be determined by other suitable methods of analyzing the initial locations, such as using artificial intelligence or machine learning models. The initial locations from the different methods may be combined. The initial locations may be aggregated based on a probability and error model. The initial locations may be combined and/or aggregated using a static discrimination model. A model suitable to determine the final location may be a mathematical model, such as an iterative mathematical model. The model may continuously aggregate data, initial locations or position estimates from the multiple signal modules 112. The model may correlate the initial locations or position estimates and may determine the associated errors of each correlated initial location or position estimate. The model may comprise, or the initial locations may have, different weights or multiplication factors, depending on the type of wireless communication signal used. The final location of the user device 102 may be determined using probability distributions.

Figure 3:
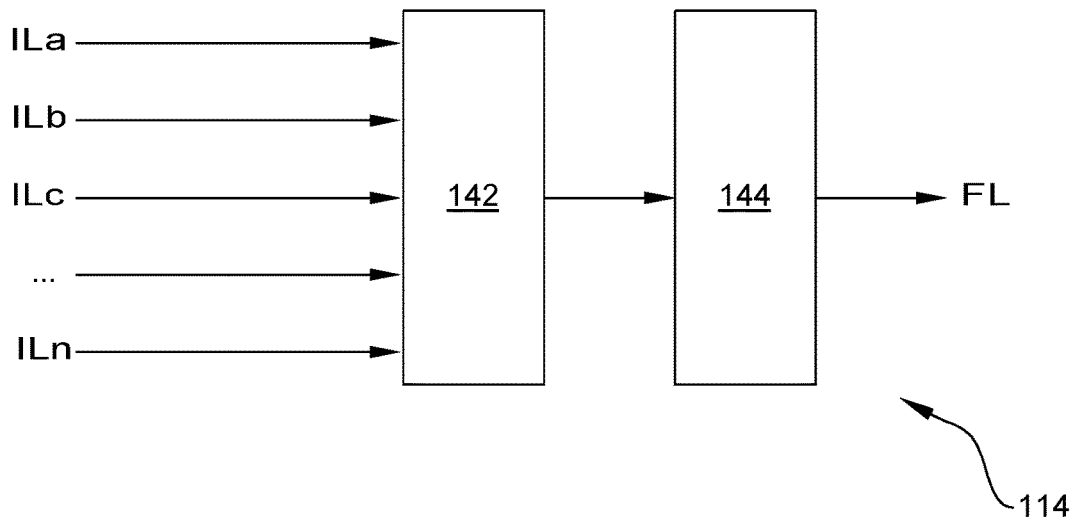
FIG. 3 shows an illustration of a method, in accordance with an embodiment of the disclosure, performed in localization module 114 to determine the final location of a user device 102 relative to vehicle 120.

The final location of the user device 102 may be determined in localization module 114 according to a method illustrated in FIG. 3, in accordance with an embodiment of the present disclosure. Referring to FIG. 3, ILa represents an initial location or a position estimate of the user device 102 determined by signal module 112*a*. Signal module 112*a* may utilize a localization algorithm A to estimate the position ILa of user device 102. Such localization algorithm A may comprise any algorithm as disclosed herein, for example a method utilizing Received Signal Strength Indicator (RSSI). Signal module 112*b* may utilize a localization algorithm B to estimate the position ILb of user device 102. Such localization algorithm B may comprise any algorithm as disclosed herein, for example a method utilizing Time of Flight (ToF). Signal module 112*c* may utilize a localization algorithm C to estimate the position ILc of user device 102. Such localization algorithm C may comprise any algorithm as disclosed herein, for example a method also utilizing RSSI. Accordingly, localization module 114 may retrieve position estimates ILa, ILb, ILc, . . . , ILn from signal modules 112 or from memory of signal modules 112 or ECU in step 142 of the method illustrated in FIG. 3. Localization module 114 may obtain position estimates ILa, ILb, ILc, . . . , ILn from signal modules 112 or from memory of signal modules 112 or ECU in step 142. In step 142, the initial locations or position estimates ILa, ILb, ILc, . . . , ILn may be combined and aggregated based on a suitable model. Thereafter, in step 144, a correlation of the initial locations or position estimates ILa, ILb, ILc, . . . , ILn may be executed. An error may be determined for each initial location or position estimate ILa, ILb, ILc, . . . , ILn. A position that is determined to have the highest correlation or lowest error may be identified as the output FL of step 144. That is, the output of step 144 is the final location or the most probable final location as disclosed herein.

The final location of the user device 102 may be determined by calculating a probability distribution of an estimated final location for each determined initial location. The most probable final location may be determined based on the probability distributions. A probability distribution may be determined for each initial location. An estimate of the actual location of the user device 102 may be selected as the location representing a peak of the curve. Thus, there may be multiple peaks from the multiple probability distribution curves. A margin of error may be predefined. The calculated probability distributions may be correlated. Juxtaposing the probability distribution curves may illustrate overlapping estimates as well as estimates outside the margin of error. Such estimates may be considered sufficiently out of range of a predefined confidence interval of the system and may be ignored. Such outlier estimates may advantageously be made evident due to the provision of multiple initial estimates. The most probable final location that has a highest confidence level or a lowest error may be determined. The determination of a final location may be narrowed down to locations represented by the area between peaks of overlapping curves. Thus, a better estimate of the actual location of the user device 102 may be determined.

The final location of the user device 102 may be determined by calculating a probability distribution of an estimated final location based on the initial locations. The initial locations of the user device 102 relative to the vehicle 120 may be plotted on a map. Any plotted locations outside a predefined margin of error may be ignored. The most probable final location that has a highest confidence level or a lowest error may be determined. Any plotted locations within a progressively narrowing confidence interval may be determined as the most probable final location. Alternatively, a probability distribution may be calculated for the plotted locations. The most probable final location may be determined based on the probability distribution.

Figures 4A, 4B:
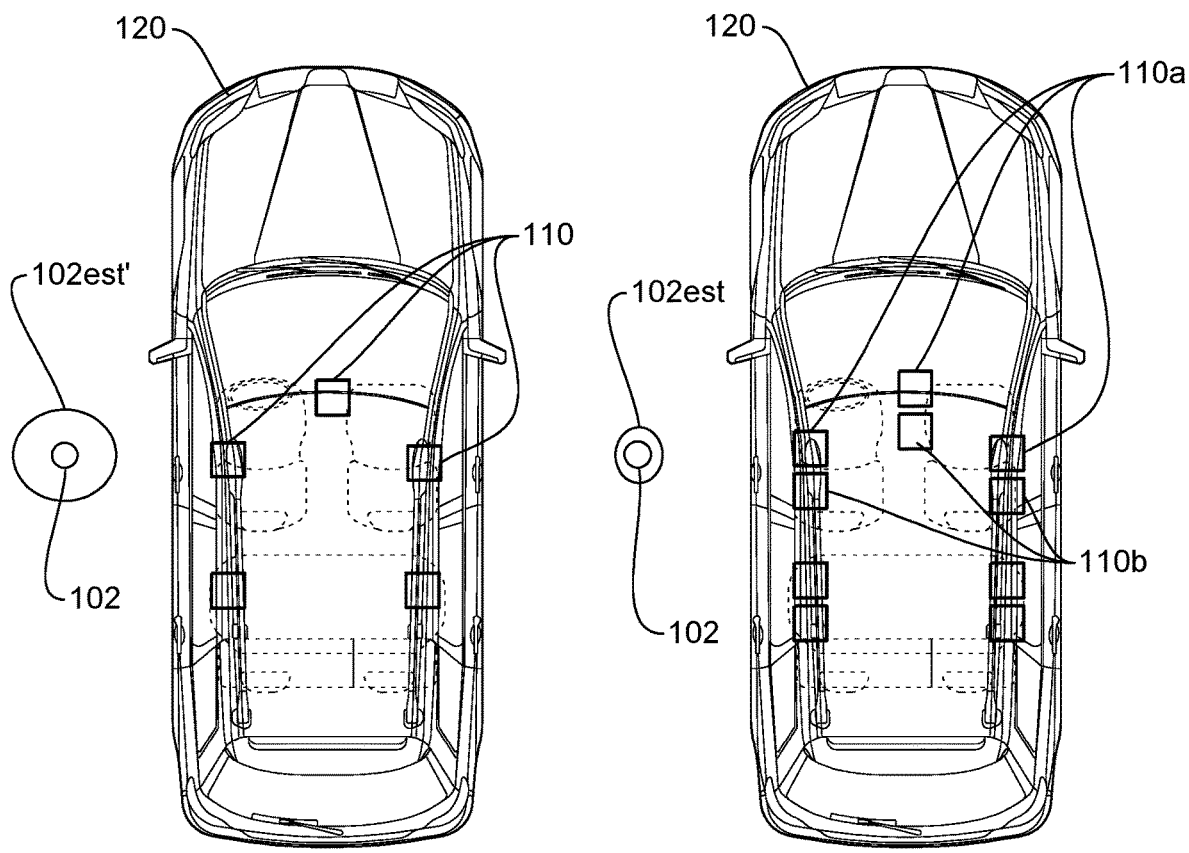
FIG. 4A shows an illustration of a position estimate 102est' obtained from a vehicle 120 that has one wireless technology-based access system.
FIG. 4B shows an illustration of a position estimate 102est obtained from a vehicle 120 that has two wireless technology-based access systems.

Due to the multi-lateral use of multiple localization systems to identify the same position, that is, a user device 102, the uncertainty of positioning or localization of the user device 102 decreases. As shown in FIG. 4A, a vehicle 120 comprising one wireless technology-based access system with five transceivers may estimate the position of a user device 102 as 102*est'*. In FIG. 4B, a vehicle 120 comprising two wireless technology-based access systems, each system having five transceivers, may estimate the position of a user device 102 as 102*est*. It can be seen that 102*est'* has a larger uncertainty and/or larger error than 102*est*.

The initial location and the final location of the user device 102 determined by the disclosed system or the disclosed method may be relative to a door of the vehicle 120. Once a final location is determined, as disclosed herein, controller 116 may be configured to lock or unlock a door of the vehicle 120. The door closest to the determined final location of the user device may be locked or unlocked. The controller 116 may be configured to lock or unlock a door closest to the determined final location of the user device. The controller 116 may be incorporated or integrated into an ECU of the vehicle, such as a door ECU, a body control module or body ECU or a body computing unit. The controller 116 may be connected to the localization module 114 by interconnects, wire or wirelessly. The signal module 112, the localization module 114 and the controller 116 may be comprised in a common ECU, such as the body electronic control unit or computing unit.

Each signal module 112 may be configured to periodically receive, from a telematics unit, antenna module, internet gateway device or other communication module 118 of the vehicle, tuning parameters for processing the wireless communication signals received from the user device. A signal module comprising a communication module 118 may itself be configured to periodically receive tuning parameters for processing the wireless communication signals received from the user device. A RAN and/or signal module may require tuning parameters different from another RAN and/or signal module. For a particular type of wireless communication signal, RAN, transceiver set or set of receiver and transmitter and/or signal module, tuning parameters may differ from region to region. Hence, each signal module or transceiver set or set of receiver and transmitter or the ECU incorporating the signal module may be configured to receive parameter updates unique to another signal module or transceiver set or set of receiver and transmitter or the ECU incorporating the signal module. The updates may be received periodically, from time to time, or on demand. The receipt of tuning parameters may be configured as part of over-the-air updates performed by or involving the telematics or communication unit 118. The over-the-air updates may be executed in the vehicle 120 in any suitable way. For example, version rollback may be allowed so that a software version on the signal module may be rolled back to a prior version without the need to update an entire software module or to reprogram the signal module. The tuning parameters may be comprised in an update package. The update package may be an entire software module or package or may be a differential software or part of a software module or package. The telematics or communication unit 118 may be connected to the signal module 112 or an ECU incorporating the signal module 112 through the vehicle area network.

The vehicle access system may further comprise a remote server 130. The server 130 may push updates to the signal module 112. The server 130 may be configured to initiate an over-the-air update to the signal module 112. The updates may be pushed upon a trigger, e.g. periodically or upon initiation. Alternatively, the signal module 112 may request the remote server 130 for updates. The signal module 112 may be configured to initiate the update. The updates may be initiated periodically, from time to time, or on demand.

Tuning parameters may be designed to meet standards set by a governing body, for example to meet a predefined frequency range governed by International Telecommunication Union (ITU). The tuning parameters may include RAN parameters, RF parameters, algorithm software parameters based on country and regulation, multiplication factors or weights for the initial locations, which may change as more positioning data is collected over time or after each correlation cycle, decision thresholds or predefined margins of error, new or updated mathematical models for determining the final location, etc.

As mentioned above, it is an advantage that the disclosed system and method may be updated, continually or upon trigger, to adapt to changes in requirements of access systems and/or to optimize parameters or system configurations. When development of a vehicle access system has finished and is ready for production and sale, or when a phase of development of the vehicle access system has finished, the methods of determining an initial location and/or a final location, as disclosed herein, are "frozen" and stored in the memory of a module or ECU of the vehicle access system. However, government regulations, wireless technologies, user devices, etc, continue to be updated or added, and optimization of, e.g., the methods etc, continues to be done. Hence, the disclosed system and method advantageously are capable of being updated as and when needed.

The disclosed vehicle access system may be capable of operating in two or more regions. For a particular type of wireless communication signal or RAN, the system may be configured to operate at predefined frequency ranges suitable for two or more regions. The system may comprise a set of transceivers, or a set of receiver and transmitter, configured to receive a type of wireless communication signal. Within a set of transceivers may be a first subset of transceivers configured to receive the type of wireless communication signal at a first predefined frequency range and a second subset of transceivers configured to receive the type of wireless communication signal at a second predefined frequency range. Within a set of receiver and transmitter may be a first subset of receiver and transmitter configured to receive the type of wireless communication signal at a first predefined frequency range and a second subset of receiver and transmitter configured to receive the type of wireless communication signal at a second predefined frequency range. For example, set 110*a* may comprise transceiver 108, 109 and transceiver 108', 109'. Transceiver 108, 109 may be configured to receive the type of wireless communication signal at a first predefined frequency range, while transceiver 108', 109' may be configured to receive the type of wireless communication signal at a second predefined frequency range. The frequency range used to configure a subset may be dependent on design or requirements of the vehicle access system. The first predefined frequency range may be a frequency range compliant with regulatory standards of a first region. The second predefined frequency range may be a frequency range compliant with regulatory standards of a second region.

The first subset or the second subset may be selectively operated based on a geographical location of the vehicle. The selective operation may be in response to a positional coordinate of the vehicle. By determining the geographical location or positional coordinate, the disclosed system may adapt to a predefined frequency range compliant with regulatory standards. The system may be configured to deactivate a subset based on the geographical location. The system may be configured to select and switch between a subset based on the geographical location. The first subset may comprise electronic components, such as a first antenna tuner, a first receiver, such as receiver 108, and a first antenna, while the second subset may comprise electronic components, such as a second antenna tuner, a second receiver, such as receiver 108', and a second antenna. The selective operation may enable the electronic components or hardware of a subset and/or its respective signal module to operate according to prevailing ITU radio regulation standards of the geographical location or positional coordinate.

The geographical location may be identified by a location determinator of the vehicle 120 or the user device 102. A suitable location determinator may be a GPS sensor or a navigation system onboard the vehicle 120 or in the user device 102. The location determinator may identify the geographical location by any suitable method including global positioning system (GPS); global navigation satellite system (GLONASS); BeiDou system (BDS); Galileo navigation satellite system (GNSS); Navigation Indian Constellation (NavIC); and Quasi-Zenith Satellite System (QZSS).

Each set may comprise at least two subsets of transceivers, or at least two subsets of receivers and transmitters, configured to receive its respective type of wireless communication signal at different predefined frequency ranges and communication standards. When a subset, e.g. transceiver 108 and 109, from a set, e.g. transceiver set 110*a*, is selectively operated, then at least one other set, e.g. transceiver set 110*b*, may selectively operate an appropriate subset, e.g. transceiver 108" and 109", accordingly, based on the geographical location. The initial location determined by signal module 112*a* from signals received from subset 108 and 109 of set 110*a*, and the initial location determined by signal module 112*b* from signals received from subset 108″ and 109″ of set 110*b* may be transmitted to localization module 114. The localization module 114 may determine the final location of the user device 102 relative to the vehicle 120, based on these initial locations. Alternatively, the disclosed system may selectively operate or selectively deactivate a set including all of its transceivers, or all of its transmitters and receivers, in the event the geographical location of the vehicle 120 does not allow usage of the RAN or signal type in that geographical location. For example, if a vehicle access system comprises five sets, 110*a* to 110*e*, each comprising two subsets, the vehicle access system may operate subset 108,109 of both sets 110*a* and 110*c*, but deactivate sets 110*b*, 110*d* and 110*e*.

The signal module, such as signal module 112*a*, may be configured to process the one, two or more ranges of frequencies received by the subsets. Alternatively, the signal module 112*a* may comprise module 112*a*′ and module 112*a*″ (not shown), configured to process the type of wireless communication signal at the first predefined frequency range and the second predefined frequency range, respectively. The signal module 112*a* may be configured to selectively process the type of wireless communication signal according to tuning parameters specific for the selected frequency range. The signal module 112*a* may be configured to change or set the tuning parameters according to the geographical location or positional coordinate.

The vehicle access system may comprise a set, such as transceiver set 110*a*, that is configured to receive and/or transmit a specific type of wireless communication signal or RAN, which is different from the other set, such as transceiver set 110*b* of the vehicle access system. One, two or more transceivers, or receiver(s) and transmitter(s), may be comprised in a set 110*a* or 110*b*. All transceivers, or receivers and transmitters, in a set may be configured to receive the specific type of wireless communication signal at a frequency range, or alternatively, a subset of transceivers, or receiver(s) and transmitter(s), in a set may be configured to receive the specific type of wireless communication signal at a first predefined frequency range while another subset of transceivers, or receiver(s) and transmitter(s), in the set may be configured to receive the specific type of wireless communication signal at a second predefined frequency range.

A method of accessing vehicle 120 in accordance with an embodiment of the disclosure will now be described. The method comprises receiving, by at least two sets of receivers and transmitters 110*a*, 110*b* of the vehicle 120, at least two different types of wireless communication signals from corresponding transmitters of a user device 102. Each set of receiver and transmitter is configured to receive a type of wireless communication signal different from that received by at least one other set of receiver and transmitter. The method comprises processing, by each of a signal module 112*a*, 112*b* in communication with a set of receiver and transmitter, the wireless communication signals received from the set of receiver and transmitter 110*a*, 110*b*, respectively, to determine an initial location of the user device 102 relative to the vehicle 120. The method comprises determining, by a localization module 114 of the vehicle 120, a final location of the user device 102 relative to the vehicle 120, based on the initial locations determined by the signal modules 112*a*, 112*b*. The method comprises locking or unlocking a door of the vehicle 120 based on the determined final location of the user device 102.

A user 101 in possession of user device 102 may be approaching vehicle 120. A transceiver or transmitter on user device 102 may transmit a type of wireless communication signal in search of a compatible transceiver or receiver 108 of a set 110 on vehicle 120. Alternatively, transceiver or receiver 109 of a set 110 on vehicle 120 may transmit a type of wireless communication signal in search of a compatible transceiver or receiver on a user device 102. The transceiver or receiver 109 may receive the signal when the user device 102 is within a predefined zone or "unlock" zone of vehicle 120. The user device 102, type of wireless communication signal, set 110, receiver 108 and transmitter 109 may be as disclosed herein.

The wireless communication signals received by a set, such as transceiver set 110*a*, may be processed by a corresponding signal module, such as signal module 112*a*. The processing may comprise determining an initial location of the user device 102 relative to vehicle 120 based on the wireless communication signals received. The processing of signals may be as disclosed herein.

Determining the initial location of the user device 102 may comprise utilizing Received Signal Strength Indicator (RSSI), Time of Flight (ToF), Angle of Arrival (AoA), range-based methods, or any combination thereof. Determining the initial location of the user device 102 may comprise determining the signal transit time between transceivers, or between the respective receiver and transmitter. Determining the initial location of the user device 102 may comprise determining the strength of signal or power level received by the transceiver or receiver. Determining the initial location of the user device 102 may comprise determining or measuring the distance between the user device 102 and the vehicle 120 as disclosed herein. The signal transit time, strength of signal, power level, distance measurement and/or initial locations may be stored in memory of each signal module 112 or ECU.

The initial locations may be retrieved from the memory by the localization module 114. The initial locations may be transmitted to the localization module 114. Determining the final location may be as disclosed herein. For example, determining the final location of the user device 102 relative to the vehicle 120 may comprise a statistical analysis of the initial locations. In another example, determining the final location of the user device 102 may comprise calculating a probability distribution of an estimated final location for each determined initial location; and determining the most probable final location based on the probability distributions.

The disclosed method may further comprise periodically receiving, by the signal modules 112, tuning parameters for processing the wireless communication signals received from the user device 102. The method may comprise transmitting the tuning parameters during execution of over-the-air updates. The tuning parameters may be transmitted from the telematics or communication unit 118. The tuning parameters may be transmitted from remote server 130. The tuning parameters may be as disclosed herein. Receiving the tuning parameters may be as disclosed herein.

The disclosed method may enable vehicle access in two or more regions, as disclosed herein. The method may comprise operating each set 110 of transceivers, or each set 110 of receiver and transmitter, at predefined frequency ranges suitable for two or more regions. For example, receiving a type of wireless communication signal by a set of receiver and transmitter may comprise: receiving said type of wireless communication signal, by a first subset of receiver and transmitter, at a first predefined frequency range; and receiving said type of wireless communication signal, by a second subset of receiver and transmitter, at a second predefined frequency range. The predefined frequency range may be as disclosed herein, for example a frequency range compliant with regulatory standards of a region.

The method may comprise selectively operating the first subset of receiver and transmitter or the second subset of receiver and transmitter based on a geographical location of the vehicle 120. The selective operation may be as disclosed herein.

The method may comprise identifying the geographical location by a location determinator, such as one disclosed herein. The geographical location identified may be transmitted to each signal module 112 or ECU. The signal module 112 or ECU may select an appropriate frequency range corresponding to the geographical location from a lookup table stored in the memory. From the frequency range selected, the appropriate subset is selectively operated or deactivated.

The method may comprise processing, by each signal module 112, the one, two or more ranges of frequencies of wireless communication signals received from the selectively operated subset.

The invention claimed is:

1. A vehicle access system comprising:
  at least two sets of a receiver and a transmitter, wherein each set of receiver and transmitter is configured to receive a type of wireless communication signal from a corresponding transmitter of a user device, and wherein the type of wireless communication signal received by a set of receiver and transmitter is different from that received by at least one other set of receiver and transmitter;
  a signal module in communication with each set of receiver and transmitter, wherein each signal module is configured to process the wireless communication signals received from a set of receiver and transmitter and to determine based on the wireless communication signal processing at the signal module an initial location of the user device relative to the vehicle;
  a localization module different from but in communication with the signal modules, wherein the localization module is configured to determine a final location of the user device relative to the vehicle, based on the initial locations determined by the signal modules; and
  a controller configured to lock or unlock a door of the vehicle based on the determined final location of the user device,
  wherein the final location of the user device is determined by:
  calculating a probability distribution of an estimated final location for each determined initial location; and
  determining most probable final location based on the probability distributions using an iterative mathematical model.

2. The system of claim 1, wherein the initial location and the final location are relative to a door of the vehicle.

3. The system of claim 2, wherein the controller is configured to lock or unlock a door of the vehicle closest to the determined final location of the user device.

4. The system of claim 1, wherein the type of wireless communication signals is selected from low frequency signals, radio frequency signals, high frequency signals, ultra-high frequency signals, mmWave signals, signals from ultra-wide band protocol, signals from ultra-narrow band protocol, or signals from Bluetooth Low Energy protocol.

5. The system of claim 1, wherein the initial location of the user device is determined by the signal module by Received Signal Strength Indicator, Time of Flight, Angle of Arrival, range-based methods, or any combination thereof.

6. The system of claim 1, wherein the final location of the user device is determined by a statistical analysis of the initial locations.

7. The system of claim 1, wherein the signal module is configured to periodically receive, from a telematics unit of the vehicle, tuning parameters for processing the wireless communication signals received from the user device.

8. The system of claim 1, wherein a set of receiver and transmitter configured to receive a type of wireless communication signal comprises:
  a first subset of receiver and transmitter configured to receive said type of wireless communication signal at a first predefined frequency range; and
  a second subset of receiver and transmitter configured to receive said type of wireless communication signal at a second predefined frequency range.

9. The system of claim 8, wherein the first subset of receiver and transmitter or the second subset of receiver and transmitter is selectively operated based on a geographical location of the vehicle.

10. The system of claim 1, wherein the signal module and the localization module are comprised in an access electronic control unit.

11. The system of claim 1, wherein the signal module, the localization module and the controller are comprised in a body electronic control unit.

12. A method of accessing a vehicle, the method comprising:
  receiving, by at least two sets of receivers and transmitters of the vehicle, at least two different types of wireless communication signals from corresponding transmitters of a user device, wherein each set of receiver and transmitter is configured to receive a type of wireless communication signal different from that received by at least one other set of receiver and transmitter;
  processing, by each signal module in communication with a set of receiver and transmitter, the wireless communication signals received from the set of receiver and transmitter;
  determining, at the signal module, based on processing the wireless communication signals, an initial location of the user device relative to the vehicle;
  determining, by a localization module, different from but in communication with the signal modules, of the vehicle, a final location of the user device relative to the vehicle, based on the initial locations determined by the signal modules; and
  locking or unlocking a door of the vehicle based on the determined final location of the user device,
  wherein determining the final location of the user device comprises:
  calculating a probability distribution of an estimated final location for each determined initial location; and
  determining most probable final location based on the probability distributions using an iterative mathematical model.

13. The method of claim 12, wherein the initial location and the final location are relative to a door of the vehicle.

14. The method of claim 13, wherein the door of the vehicle closest to the determined final location of the user device is locked or unlocked.

15. The method of claim 13, wherein the type of wireless communication signals is selected from low frequency signals, radio frequency signals, high frequency signals, ultra-high frequency signals, mmWave signals, signals from ultra-wide band protocol, signals from ultra-narrow band protocol, or signals from Bluetooth Low Energy protocol.

16. The method of claim 12, wherein determining the initial location of the user device by the signal module comprises: utilizing Received Signal Strength Indicator, Time of Flight, Angle of Arrival, range-based methods, or any combination thereof.

17. The method of claim 12, wherein determining the final location of the user device comprises a statistical analysis of the initial locations.

18. The method of claim 12, further comprising: periodically receiving, by signal modules, tuning parameters for processing the wireless communication signals received from the user device.

19. The method of claim 13, wherein receiving a type of wireless communication signal by a set of receiver and transmitter comprises:
   receiving said type of wireless communication signal, by a first subset of receiver and transmitter, at a first predefined frequency range; and
   receiving said type of wireless communication signal, by a second subset of receiver and transmitter, at a second predefined frequency range.

20. The method of claim 19, further comprising: selectively operating the first subset of receiver and transmitter or the second subset of receiver and transmitter based on a geographical location of the vehicle.

* * * * *